United States Patent
Zyla et al.

[11] Patent Number: 5,809,759
[45] Date of Patent: Sep. 22, 1998

[54] BEAN HARVESTER

[75] Inventors: Lloyd E. Zyla; Lal R. Kushwaha; William B. Reed, all of Saskatoon, Canada

[73] Assignee: The University of Saskatchewan, Saskatoon, Canada

[21] Appl. No.: 750,380

[22] PCT Filed: Jun. 1, 1995

[86] PCT No.: PCT/CA95/00324

§ 371 Date: Feb. 18, 1997

§ 102(e) Date: Feb. 18, 1997

[87] PCT Pub. No.: WO95/33365

PCT Pub. Date: Dec. 14, 1995

[30] Foreign Application Priority Data

Jun. 7, 1994 [CA] Canada .................................. 2125384

[51] Int. Cl.$^6$ ............................ A01D 34/14; A01D 34/40
[52] U.S. Cl. ............................ 56/298; 56/307; 56/364; 56/220
[58] Field of Search .................... 56/364, 327.1, 56/327.2, 226, 227, 298, 307, 308, 310, 312, 313, 328.1, 220

[56] References Cited

U.S. PATENT DOCUMENTS

| | | |
|---|---|---|
| 3,260,041 | 7/1966 | McRoberts et al. . |
| 3,812,661 | 5/1974 | Baker . |
| 3,844,094 | 10/1974 | Janzen . |
| 4,255,920 | 3/1981 | Janzen . |
| 4,301,644 | 11/1981 | Henderson . |
| 4,445,314 | 5/1984 | Gust . |
| 4,528,806 | 7/1985 | Klinner ................................ 56/364 |
| 4,799,352 | 1/1989 | Amstutz ............................... 56/364 |
| 5,105,610 | 4/1992 | Britten ................................. 56/298 |
| 5,375,399 | 12/1994 | Kraft ................................ 56/364 X |

FOREIGN PATENT DOCUMENTS

| | | |
|---|---|---|
| 733927 | 11/1969 | Belgium . |
| 878328 | 2/1943 | France . |
| 8600471 | 2/1986 | Germany . |
| 2 088 686 | 6/1982 | United Kingdom . |

Primary Examiner—Heather Shackelford
Attorney, Agent, or Firm—Murray E. Thrift; Adrian D. Battison

[57] ABSTRACT

A crop harvester has bristle guards (39) mounted on the cutter bar (14) as crop lifters and to capture fruit lost by dehiscence during cutting. Each bristle guard is a set of laterally oriented bristles (44). Dehisced fruit is swept into the header by a pickup reel (16) having bristle bats (74). The bristles (76) are supported on the leading side by a strip (78) of flexible belting. The belting protects the bristle against being cut by the cutter bar. The crops are supported against being pushed forward by the bristle bats (74) of the reel. The diameter is reduced to about one-half normal and the reel index in increased to provide an aggressive reel operation, ensuring that plants are properly engaged in the bristle guards for cutting.

12 Claims, 3 Drawing Sheets

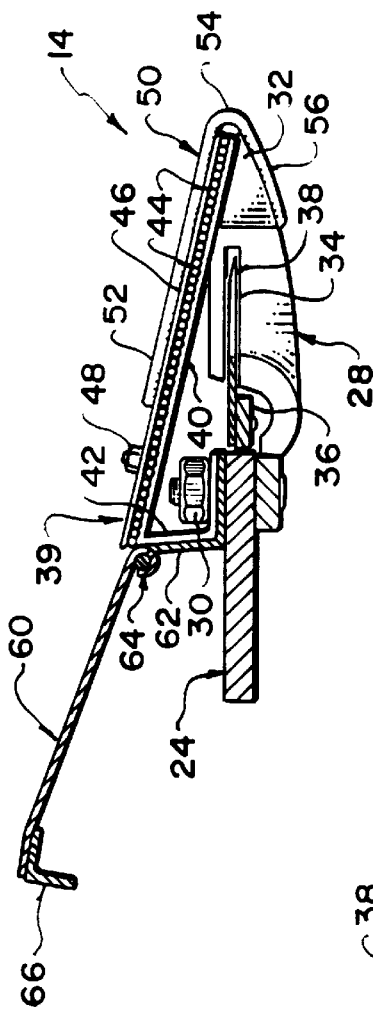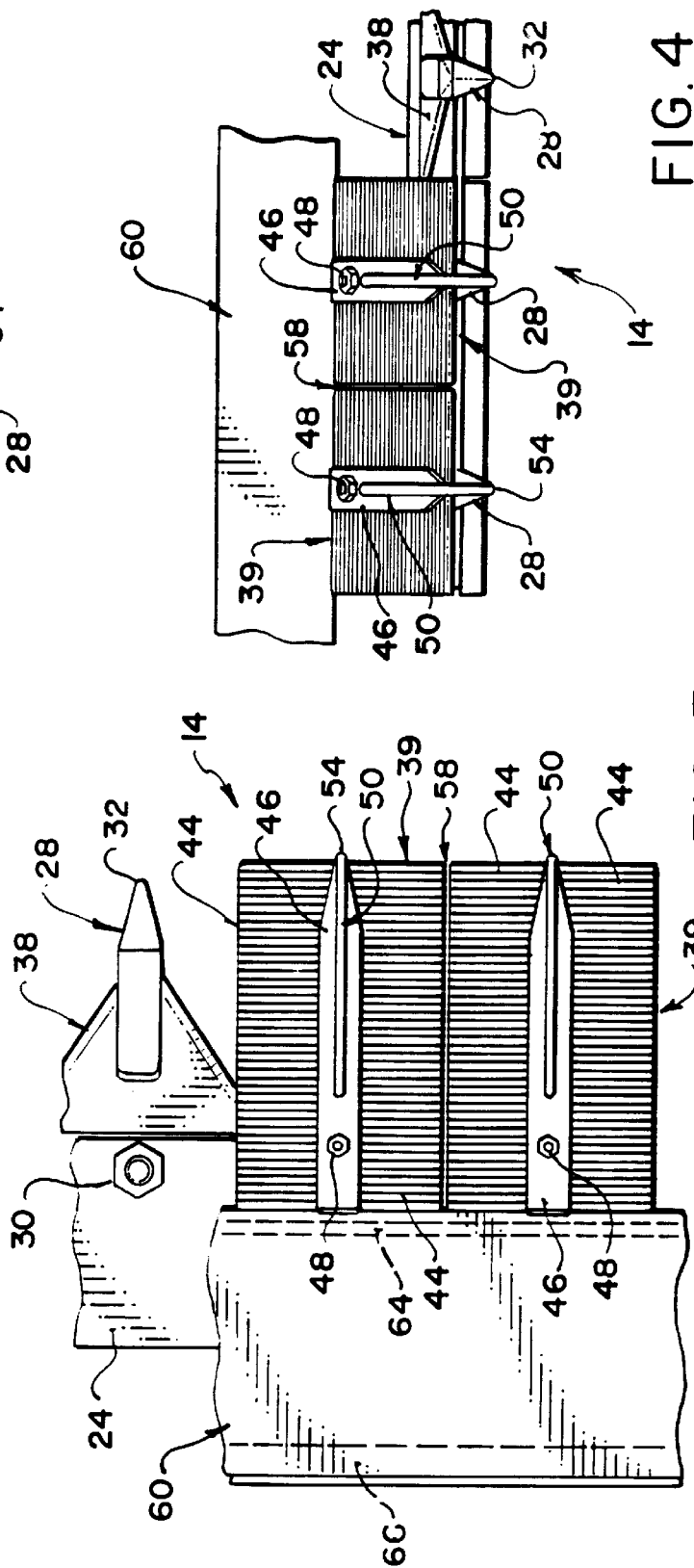

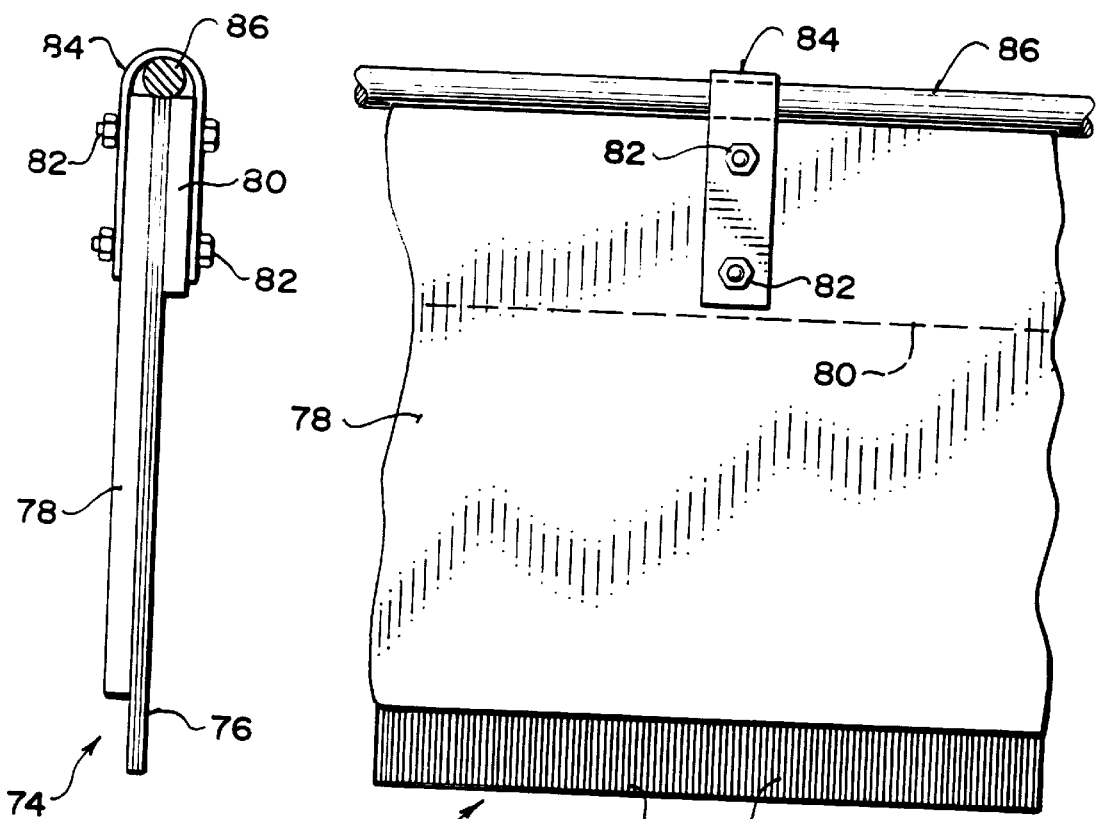
FIG. 5
FIG. 6
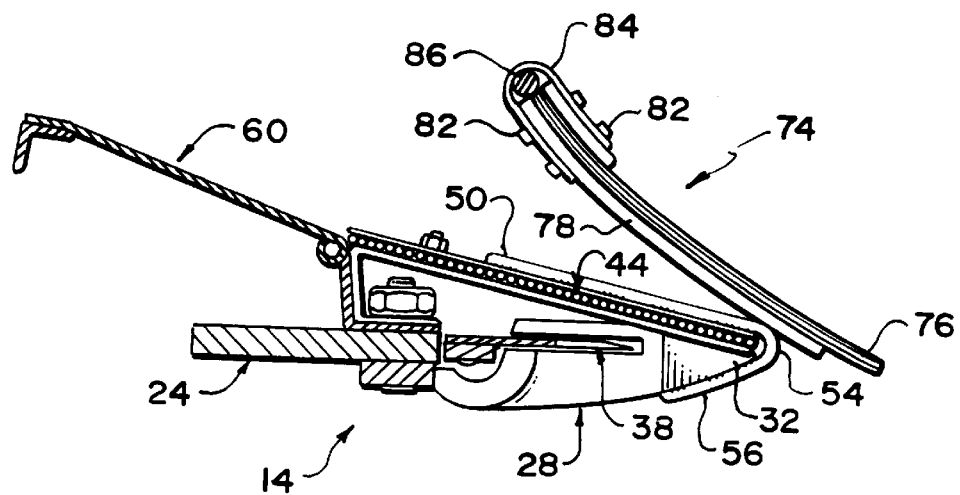
FIG. 7

BEAN HARVESTER

FIELD OF THE INVENTION

The present invention relates to crop harvesters and more particularly to a crop harvester for cutting and gathering a crop as the harvester moves in a direction of travel across a field, the harvester including a cutter bar having a knife bar for cutting the crop and gathering means for collecting the cut crop.

The invention is concerned with improvements in such harvesters for reducing losses in gathering crops, for example dry beans, that are subject to significant losses in harvesting.

BACKGROUND

One source of crop losses is dehiscence that occurs in cutting. Generally, when the oscillating knife of a conventional cutter bar cuts the stem of a plant, the forces applied to the plant produce a high acceleration and rapid displacement that can cause the fruit of the plant to dehisce. Much of this dehisced fruit is directed into the following harvester header by a rotating pickup reel positioned above the cutter bar. However, some of the fruit can fall straight down to the sickle and be lost, or it can fall onto the front edge of the harvester header where the vibration and movement of the harvester can cause it to move forwards and fall off the cutter bar.

Another source of crop loss is an inability to pick up the crop for cutting and delivery to the harvester. For crops that grow close to ground level, it is often necessary to provide a mechanical system for lifting the fruit above the cutter bar. The prior art mechanism for doing this is a series of crop lifters that are attached to the cutter bar guards and which extend down to ground level in front of the cutter bar to lift the crop from ground level and provide a transition for the crop between ground level and the harvester, header. These crop lifters work well in vine-type crops or lodged cereals, but do not work well in crops in which the plants have single central stems with the fruit grouped closely around the stems (e.g. dry bean crops). These plants can pass between the fingers of the crop lifters, rendering the crop lifters ineffective.

In addition, the prior art reel mechanisms, in the form of bat reels, pickup reels and air reels, do not work particularly well for sweeping dehisced fruit into the header of the harvester. The bat reel and the pickup reel have no provision for operation in close proximity to a floating cutter bar. When a floating cutter bar moves into the path of a reel, damage to the bats, the pickup reel teeth and the cutter bar can occur. With an air reel, the forces produced are insufficient to provide a positive feed of crop material from the cutter bar to the header.

The present invention relates to certain improvements in crop harvesting machinery that reduces losses from these causes.

SUMMARY

According to one aspect of the present invention there is provided a crop harvester for cutting and gathering a crop as the harvester moves in a direction of travel across a field, the harvester including a cutter bar having a knife bar for cutting the crop and gathering means for collecting the cut crop, and characterized by:

a plurality of bristle guards mounted side by side on the cutter bar, each bristle guard comprising a set of bristles extending transversely of the direction of travel, and the bristles of adjacent bristle guards having confronting free ends so as to allow the passage of plant stems therebetween.

The bristles capture fruit loss due to dehiscence in cutting and hold the fruit to be swept into the header by a reel. The bristles also provide a lifting action for the full width of the cutter bar. The central stem of the plant may pass between adjacent sets of the bristles, while the bristles lift the fruit above the cutter bar.

The "bristles" are resilient elements that may be similar to the bristles of a brush. They may also be thicker than conventional brush bristles, more like rods or bars, and spaced further apart than the bristles of a conventional brush. They must be sufficiently yielding to allow the plant stems to pass through to the cutter, but stiff enough to hold the dehisced fruit.

To assist with feeding the fruit captured by the bristles, a transition plate may be mounted on the back of the cutter bar to extend to the header. Where the cutter bar floats in front of a rigid header, the transition plate is hinged to the back of the cutter bar.

The harvester may also include a bat reel positioned above the cutter bar for urging the crop into the cutter bar and sweeping cut crop from the cutter bar into the gathering means, the reel comprising transversely spaced reel ends and a plurality of bats extending between the reel ends, the reel being characterized in that the bats are pivotally mounted on the reel ends for free pivotal movement about respective transverse bat axes spaced peripherally about the reel, and each bat comprises a plurality of bristles extending outwardly from the respective bat axis.

The reel may also be used alone, without the bristle guards. Thus, according to another aspect of the present invention there is provided, in a crop harvester having a cutter bar for cutting the crop as the harvester proceeds in a direction of travel across a field, gathering means for collecting the crop cut by the cutter bar and a bat reel positioned above the cutter bar for urging the crop into the cutter bar and sweeping cut crop from the cutter bar into the gathering means, the improvement wherein the reel comprises transversely spaced reel ends and a plurality of bats extending between the reel ends and pivotally mounted thereon for free pivotal movement about respective transverse bat axes spaced peripherally about the reel, and each bat comprises a plurality of bristles extending outwardly from the respective bat axis.

These bristle bats are found to provide an effective positive sweeping action in delivering the dehisced fruit to the header.

The cutter bar bristle guards resist crop material movement through the bristle guard into the cutter. This resistance can cause the stems of plants of certain crops to be pushed forward, without being cut, if a bat of the pickup reel is not in the correct position to provide the necessary support. The prior art pickup reels have a typical diameter of 1.2 meters. They operate at reel indices of 1.1 to 1.5, which minimizes reel damage to the crop. However, the time between bat contacts with the crop is large and cutting efficiency is reduced when plants are pushed over due to the resistance of the bristle guards. To alleviate this, the reel diameter is preferably less than the conventional 1.2 meter reel diameter, e.g. 0.6 meters. This reduces the spacing between adjacent bats and therefore the time between bat contacts with the crop.

With the smaller diameter reel, it is also possible to increase this reel index, that is the ratio of reel peripheral speed to ground speed of the harvester. Most damage to crop material by a pickup reel occurs when the speed of the pickup reel, with respect to the incoming crop material, or ground, reaches a maximum. This occurs when the bat is at the bottom dead centre position of the reel. With the reduced diameter, and with the axis of the pickup reel above the cutter bar, the reel bat approaches its maximum speed relative to ground over a shorter distance ahead of the cutter bar. This allows the use of a higher reel index, greater than 1.5, with a correspondingly higher pickup reel bat speed over the cutter bar. This produces an aggressive, positive movement of the plant stems into the cutter bar.

When used with a floating cutter bar, the bats preferably have panels along the sides of the bristles facing towards the cutter bar. These panels engage the cutter bar guard to prevent the bristles from being cut. This action may be assisted with runners along the top of the cutter bar guards, extending upwardly and to the rear. The panels are desirably made from flexible rubber belting.

BRIEF DESCRIPTION OF THE DRAWINGS

In the accompanying drawings, which illustrate an exemplary embodiment of the present invention:

FIG. 2 is an enlarged cross sectional view of a cutter bar with bristle guards and a transition plate mounted thereon;

FIG. 3 is a top view of a section of the cutter bar with the bristle guards and transition plate omitted at one end;

FIG. 4 is a front view of the section of cutter bar with the bristle guards and transition plate omitted at one end;

FIG. 5 is a side view of a reel bat;

FIG. 6 is a rear view of a reel bat; and

FIG. 7 is a side view showing the engagement of a reel bat with the cutter bar runners.

DETAILED DESCRIPTION

Figure 1:
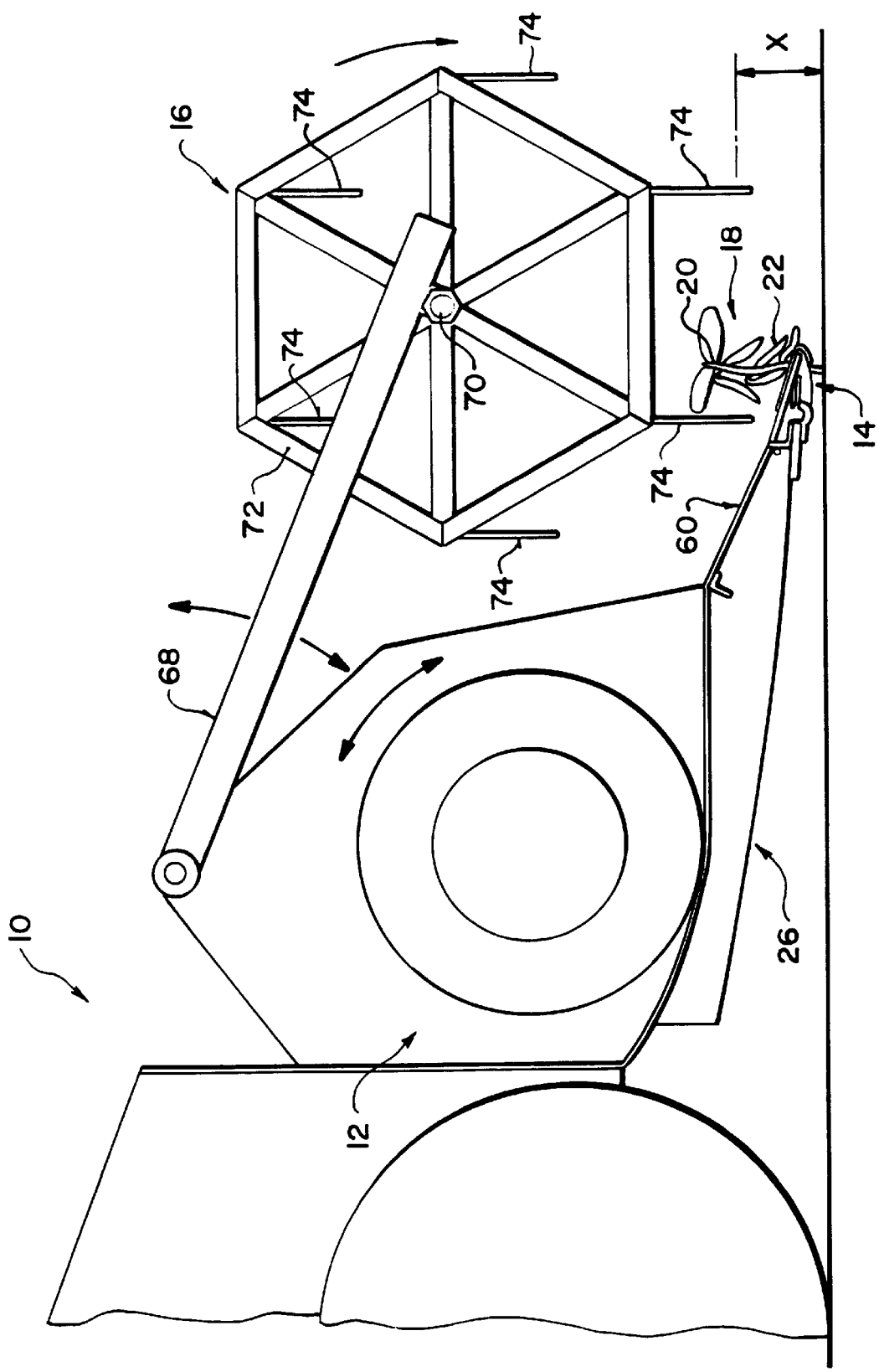
FIG. 1 is a side view of a harvester.

Referring to the accompanying drawings, and especially to FIG. 1, there is illustrated schematically a harvester 10 of conventional form. The harvester carries a rigidly mounted header 12 for receiving cut crop and a floating cutter bar 14 for cutting the crop. Mounted above the cutter bar 14 is a bat reel 16 for urging the crops into the cutter bar and sweeping the cut crops from the cutter bar into the header.

The harvester is intended to cut plants such as plant 18 illustrated in FIG. 1, with a central stem 20 and seed pods 22 grouped closely around the stem and near the ground. With plants of this sort, the shaking of the plant during cutting may cause dehiscence of the seed pods.

The configuration of the cutter bar is illustrated most particularly in FIGS. 2, 3 and 4. The cutter includes a mounting bar 24 (FIG. 2) that extends from side to side of the harvester, in front of the header. This mounting bar 24 is mounted on a floating mount 26 (FIG. 1) of conventional form that allows the cutter bar to float vertically within the range illustrated at "x" in FIG. 1, and thus closely follow the ground contours.

Mounted at spaced positions along the mounting bar 24 are cutter bar guards 28. The guards are mounted in pairs on the mounting bar using mounting bolts 30. Each guard has a nose 32 projecting to the front of the cutter bar and a horizontal knife slot 34 in the back of the guard where it confronts the mounting bar 24. Between the mounting bar 24 and the slot 34 of the guard is a knife bar 36 that extends from end to end of the cutter bar. The knife carries a series of V-shaped knife sections 38 that are riveted to the knife bar to provide a conventional cutter bar sickle or knife bar. In use, this oscillates from side to side in the guards 28. Cutter bars of this general sort and their components are commercially available.

Mounted on the cutter bar, above each guard, is a bristle guard 39. The bristle guard includes a narrow, flat clamping plate 40 that extends upwardly and to the rear from the nose of the guard. At the upper, rear edge, the clamping plate 40 is formed into a bracket 42 that extends downwardly to the mounting bar 24 to be fastened in place by one of the guard mounting bolts 30.

The clamping plate 40 supports a set of bristles 44 extending transversely across the clamping plate, roughly half-way to the next adjacent guards. The bristles are distributed along the clamping plate, from the nose of the guard, to the rear of the clamping plate. To hold the bristles in place, a top clamping plate 46 is positioned over the centre of the bristles, immediately above the clamping plate 40. The two clamping plates are fastened to one another using bolts 48.

Secured to the top clamping plate 46 is a runner 50. This is a rod with a top section 52 extending along the centre of the top clamping plate 46 to a bend 54 extending around the front of the nose 32 of the associated guard. A bottom section 56 of the runner leads from the nose 54; along the bottom of the guard.

As illustrated most particularly in FIGS. 3 and 4, the bristle guards are mounted on the cutter bar guards 28 with the free ends of the bristles of adjacent bristle guards confronting one another with a narrow gap 58 between the bristles of the two guards.

A transition plate 60 extends from the rear of the bristle guards to the front of the header 12. Brackets 62 at the front edge of the transition plate 60 are secured to the cutter bar using guard mounting bolts 30. At the front edge of the transition plate is a hinge 64 that connects the transition plate to the brackets 62. The back of the transition plate rests on a mounting bar 66 at the front edge of the header 12. The transition plate may thus pivot about the lateral axis of the hinge 64, to accommodate floating movement of the cutter bar.

The reel 16 includes two reel lift arms 68 on opposite sides of the harvester. Each arm supports the hub 70 of a reel end frame 72. These reel end frames carry a set of bats 74 that extend transversely of the harvester, between the end frames. As illustrated most particularly in FIGS. 5 and 6, each bat includes a set of parallel bristles 76 supported on a backing panel 78 of flexible rubber belting. The backing panel is on that side of the bristles facing towards the cutter bar 14. The bristles extend below the backing panel 78. A short clamping panel 80 extends along the opposite side of the bristles and is bolted to the backing panel 78 with bolts 82 to clamp the bristles between the two panels. The bolts 82 also secure brackets 84 to the bat. The brackets engage a rod 86 extending along the edge of the bracket between the two reel end frames. The bats are suspended from their rods to pivot freely about the lateral axes of the rods as the reel is rotated. The illustrated reel has a diameter of 0.6 m, approximately one half the conventional reel diameter.

In operation of the apparatus, the harvester is advanced across a field. The stems of plants to be harvested are engaged by the bristle guards, below the seed pods. The stems are forced into the gaps between the adjacent sets of bristles by the reel bats. This lifts the seed pods of the plant away from the cutter so that they are not directly cut. When the plant is cut, the bristle guards capture fruit that would otherwise be lost due to dehiscence. Once the dehisced fruit has been captured by the bristle guards, it is swept into the header of the harvester by the bristle bats of the reel.

The backing panel 78 serves to protect the bristles when the reel is operated in close proximity to the cutter bar. The flexible belting panel engages the runners extending around the point of the cutter bar guard and over the top of the bristle guard to lift the bat bristles away from the cutter.

In use, the bristles of the bristle guard resist crop material movement through the bristle guard into the cutter. This resistance can cause the stems of plants of certain crops to be pushed forward, without being cut, if a reel bat of the pickup reel is not in the correct position to provide the necessary support. The prior art pickup reels have a typical diameter of 1.2 meters. They operate at reel indices of 1.1 to 1.5, which minimizes reel damage to the crop. However, the time between bat contacts with the crop is large and cutting efficiency is reduced when plants are pushed over due to the resistance of the bristle guards. The reduced reel diameter of 0.6 meters reduces the time between bat contacts with the crop.

As discussed in the foregoing, the smaller diameter reel makes it possible to increase the reel index, that is the ratio of reel peripheral speed to ground speed of the harvester without excessive reel damage to the crop material. The higher reel index produces the necessary positive feeding of crop material through the bristle guards.

While one embodiment of the present invention has been described in the foregoing, it is to be understood that other embodiments are possible within the scope of the invention. While the bristles of the bristle guards have been illustrated as extending generally perpendicularly to the direction of travel, they may also slope back towards the header. This arrangement is intended to be included in the description of the bristles as extending "transversely of the direction of travel". The extent of the bristle guards beyond the front and back of the knife bar may also be varied. The bristle guards may extend below the height of the knife sections at the front to engage low pods and lift them above the knife bar. The illustrated embodiment of the invention is mounted on a harvester with a fixed header and a floating cutter bar. It is also possible to use the invention with a fixed cutter bar, a floating header and a flex header. The invention is therefore to be considered limited solely by the scope of the appended claims.

We claim:

1. A crop harvester for cutting and gathering a crop as the harvester moves in a forward direction of travel across a field, the harvester including:

a cutter bar having a knife bar for cutting the crop;

cutter guards mounted at spaced positions along the knife bar, each guard having a nose projecting to the front of the knife bar;

gathering means for collecting the cut crop; and a plurality of bristle guards mounted side by side on the respective cutter guards, each bristle guard comprising a set of bristles extending transversely of the direction of travel, the bristles of adjacent bristle guards having confronting free ends so as to allow the passage of plant stems therebetween, and each bristle guard sloping downwardly in the forward direction over the knife bar substantially to the nose of the respective cutter guard.

2. A harvester according to claim 1 wherein the bristle guards extend rearwards beyond the knife bar.

3. A harvester according to claim 1 wherein the gathering means include a header and including a transition plate extending between the cutter bar and the header.

4. A crop harvester for cutting and gathering a crop as the harvester moves in a forward direction of travel across a field, the harvester including:

a floating cutter bar having a knife bar for cutting the crop;

a plurality of bristle guards mounted side by side on the cutter bar, each bristle guard comprising a set of bristles extending transversely of the direction of travel, and the bristles of adjacent bristle guards having confronting free ends so as to allow the passage of plant stems therebetween; and gathering means for collecting the cut crop, including a non-floating header, a transition plate extending between the cutter bar and the header, and hinge means pivotally mounting the transition plate on the cutter bar for pivotal movement about an axis transverse to the direction of travel.

5. A crop harvester for cutting and gathering a crop as the harvester moves in a forward direction of travel across a field, the harvester including:

a cutter bar having a knife bar for cutting the crop;

gathering means for collecting the cut crop, a plurality bristle guards mounted by side on the cutter bar, each bristle guard comprising a set of bristles extending transversely of the direction of travel, and the bristles of adjacent bristle guards having confronting free ends so as to allow the passage of plant stems therebetween; and a bat reel positioned above the cutter bar for urging the crop into the cutter bar and sweeping cut crop from the cutter bar into the gathering means, the reel comprising transversely spaced reel ends and a plurality of bats extending between the reel ends, the bats being pivotally mounted on the reel ends for free pivotal movement about respective transverse bat axes spaced peripherally about the reel, and each bat comprising a plurality of bristles extending outwardly from the respective bat axis.

6. A crop harvester having:

a cutter bar for cutting the crop as the harvester proceeds in a direction of travel across a field;

gathering means for collecting the crop cut by the cutter bar; and a bat reel positioned above the cutter bar for urging the crop into the cutter bar and sweeping cut crop from the cutter bar into the gathering means, the reel comprising:

transversely sapced reel ends;

a plurality of bats extending between the reel ends, each bat comprising a plurality of bristles extending outwardly from the respective bat axis; and pivot means pivotally mounting the bats on the reel ends for free pivotal movement about respective transverse bat axes spaced peripherally about the reel.

7. A harvester according to claim 5 wherein each bat further comprises a panel extending from end to end of the bat on a side of the bristles facing the cutter bar, the panel being shorter than the bristles.

8. A harvester according to claim 7 wherein the panel is a flexible panel.

9. A harvester according to claim 5 wherein the reel has a diameter of less than 1.2 meters.

10. A harvester according to claim 9 wherein the reel diameter is substantially equal to 0.6 meters.

11. A harvester according to claim 9 wherein the reel index is greater than 1.5.

12. A crop harvester for cutting and gathering a crop as the harvester moves in a forward direction of travel across a field, the harvester including:

a cutter bar having a knife bar for cutting the crop;

gathering means for collecting the cut crop, a plurality of bristle guards mounted side by side on the cutter bar, each bristle guard comprising a set of bristles extending transversely of the direction of travel, and the bristles of adjacent bristle guards having confronting free ends so as to allow the passage of plant stems therebetween; and a reel positioned above the cutter bar for urging the crop into the cutter bar and sweeping cut crop from the cutter bar into the gathering means.

* * * * *